INVENTORS
DAVID ALEXANDER
HANS U. BURRI
BY Roberto Spindle
ATTORNEY

United States Patent Office 3,288,565
Patented Nov. 29, 1966

3,288,565
WAVE ENGINE REACTOR
David Alexander, Feasterville, and Hans U. Burri, Philadelphia, Pa., assignors to Sun Oil Company, Philadelphia, Pa., a corporation of New Jersey
Filed June 14, 1961, Ser. No. 117,134
4 Claims. (Cl. 23—252)

This invention relates to wave engines and their operation for carrying out chemical reactions, and more particularly to novel wave engines and operation whereby superior results are obtained in chemical reactions.

In various chemical reactions, it is necessary that very high temperatures be employed and that the residence time of the reactants at the elevated temperature be very short. An example of such reaction is the production of acetylene and hydrogen cyanide by the reaction of methane and nitrogen. In this reaction, it is necessary that very rapid heating of the reactants from a temperature not greater than 900° F. to a temperature not less than 3200° F. be accomplished. This is necessary since the maintenance of the reactants too long at temperatures in the range from 900 to 3200° F. results in excessive reaction to produce undesired products such as carbon.

It is necessary therefore that the heating through this crucial range be extremely rapid. It is also necessary that upon reaching the reaction temperature, which is for example in the range from 3200 to 4000° F., the reactants be maintained at the reaction temperature for only a short time as indicated previously. It is further necessary that the reaction products be rapidly cooled from the reaction temperature to a temperature not substantially greater than 1600° F.

The present invention provides a wave engine of novel structure and operation which is capable of producing such rapid heating and cooling and which is therefore highly satisfactory for use in producing various chemical reactions which require the rapid heating and cooling. The wave engine of the invention has superior efficiency and attains the necessary high temperatures while avoiding operating problems which have characterized prior art wave engines.

Figure 1:
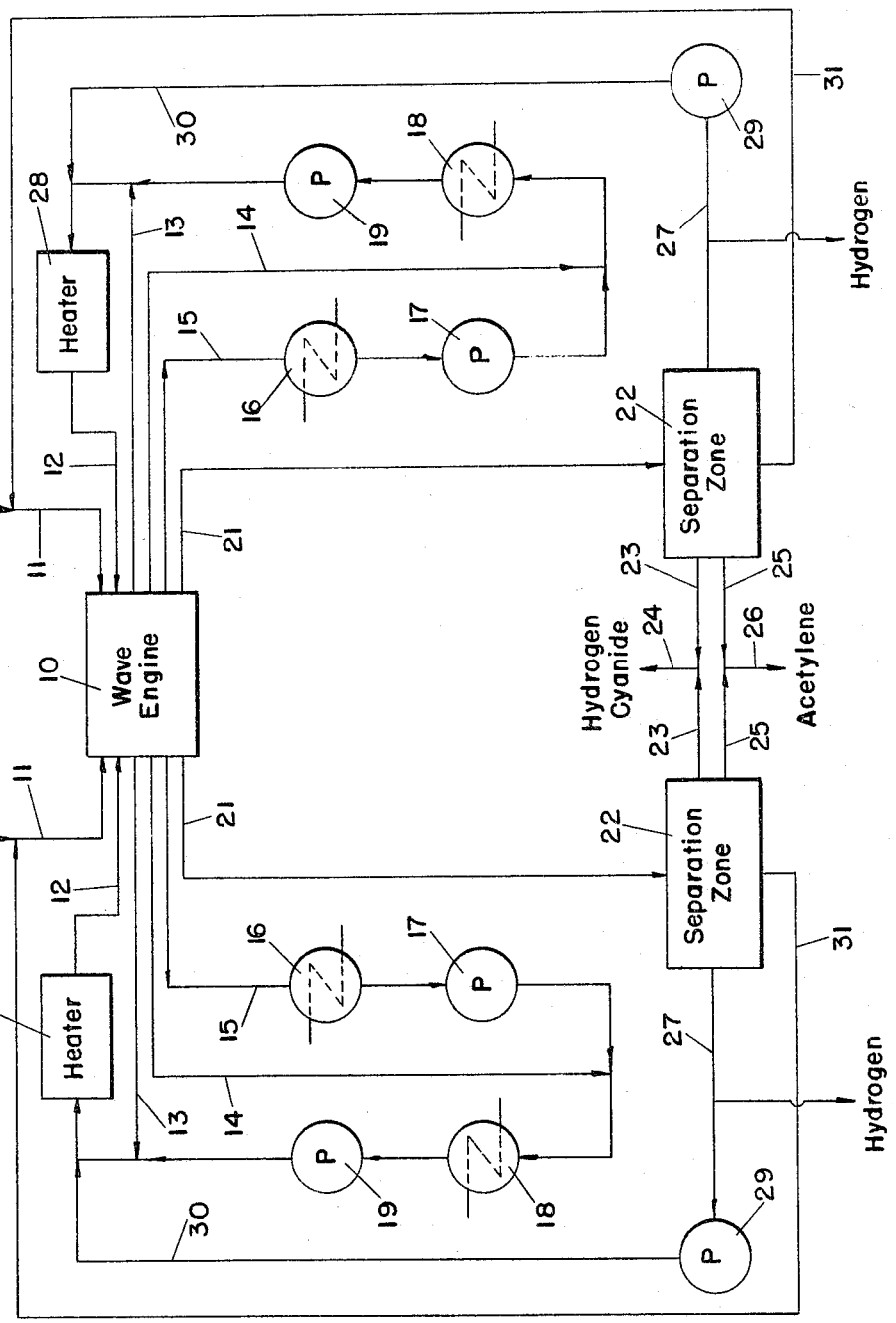
Figure 2:
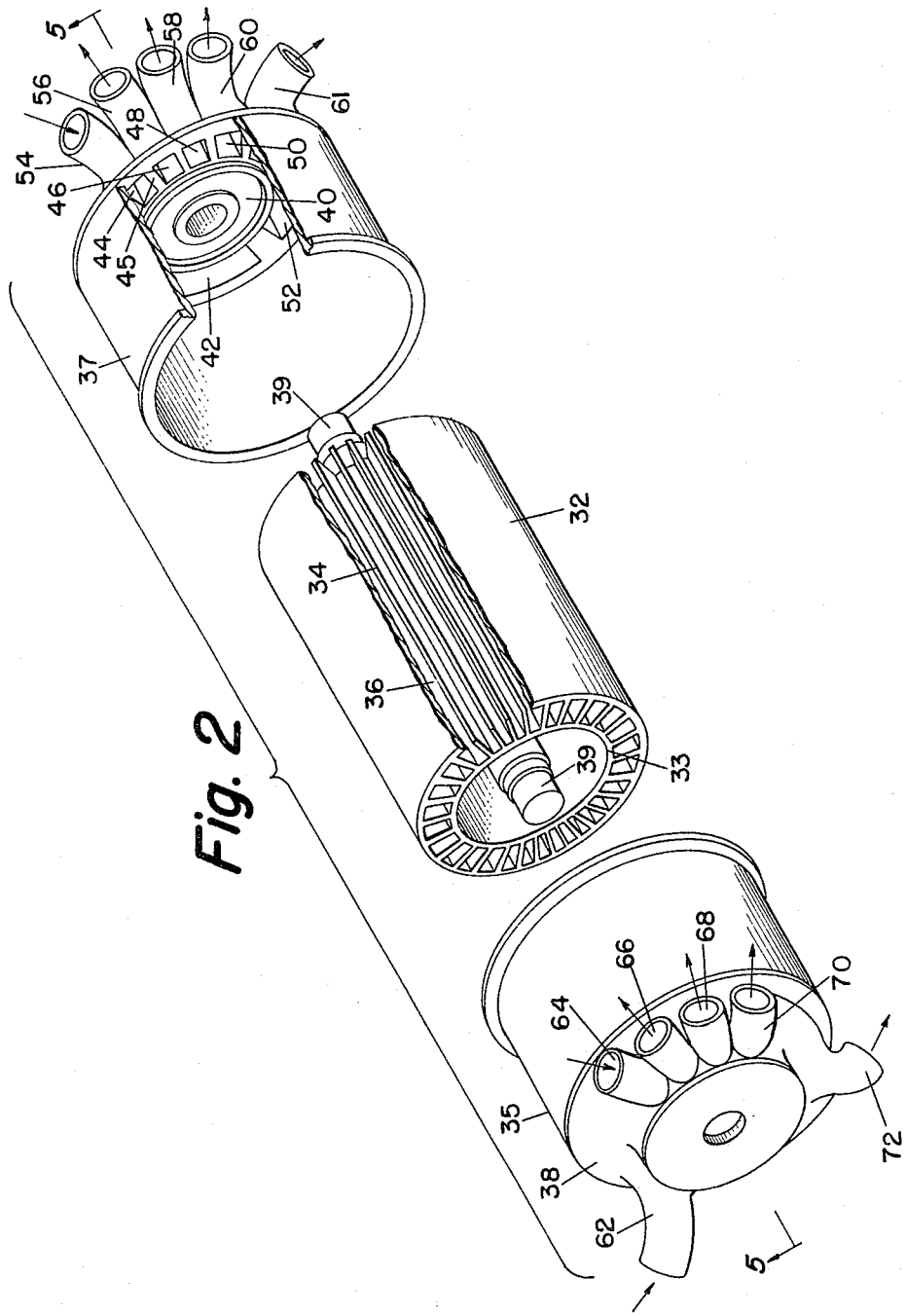
Figure 3:
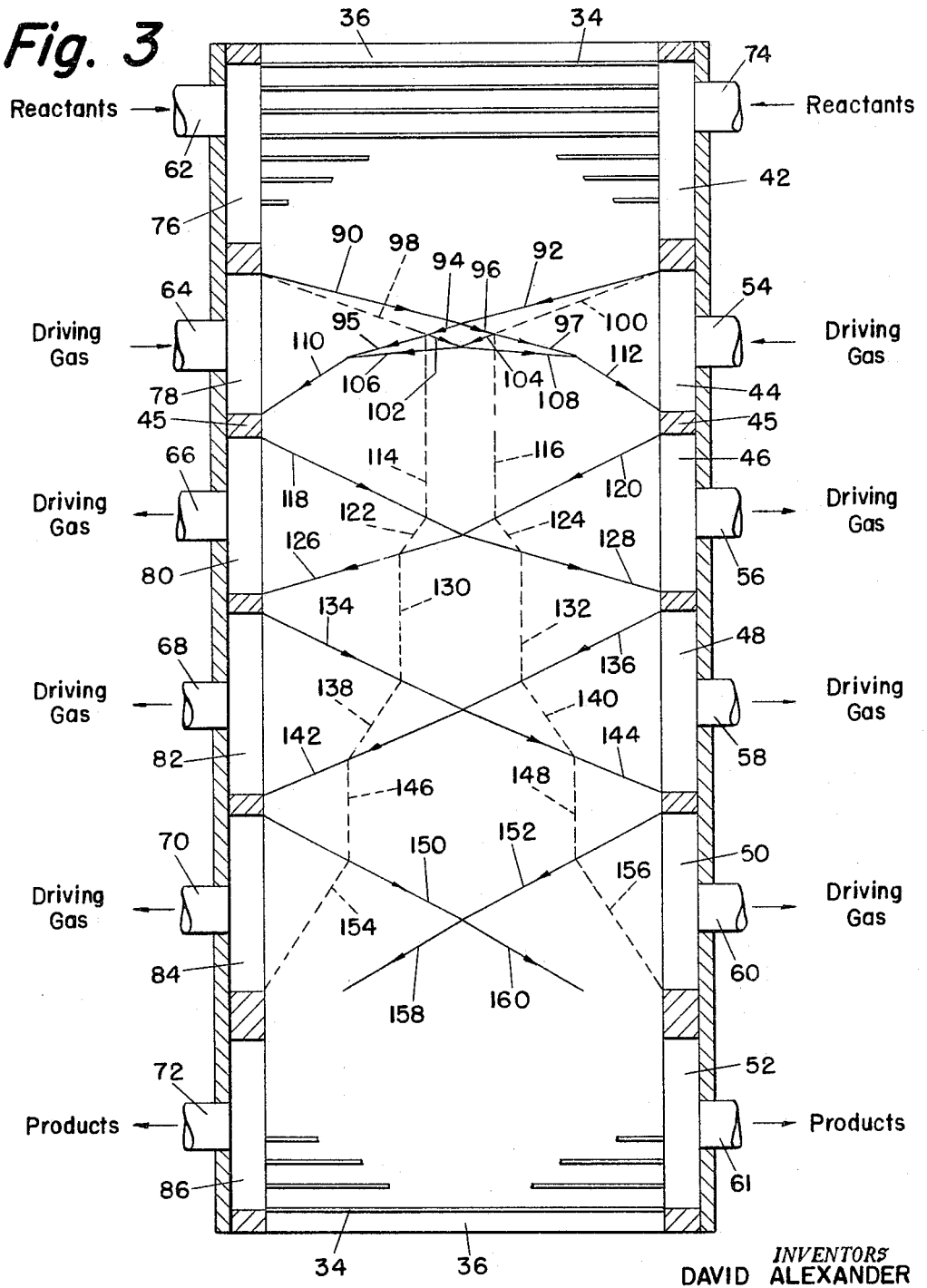
Figure 4:
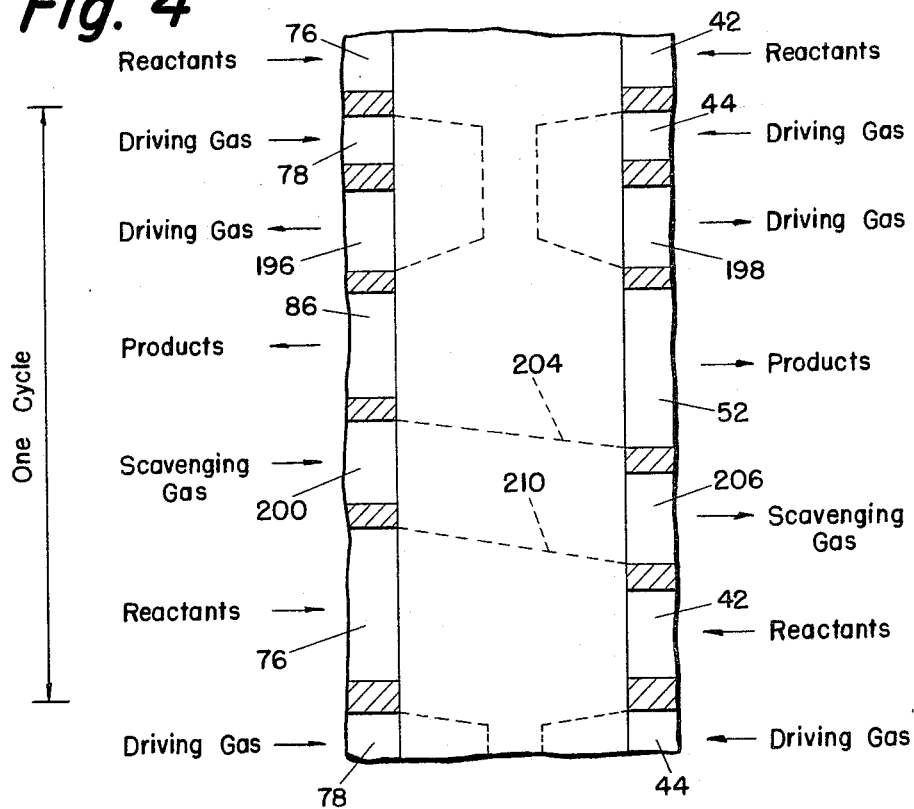
Figure 5:
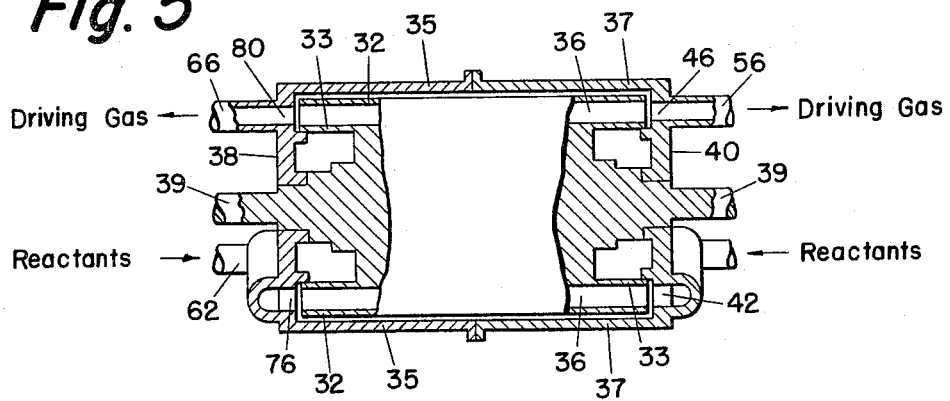

The invention will be more fully described with reference to the attached drawing wherein FIGURE 1 is a schematic flow sheet of one embodiment of the process according to the invention. In FIGURE 1 no details are given of the wave engine construction. FIGURE 2 is a composite figure showing an exploded view in perspective of one design of a wave engine according to the invention. FIGURE 3 is a development of the rotor and shell as illustrated in FIGURE 2 and illustrates the action of the gases upon introduction into the reaction channels attached to the rotor. FIGURE 4 is a development illustrating an alternative embodiment of the invention. FIGURE 5 is a sectional view of the wave engine taken along the line 5—5 in FIGURE 2.

In FIGURE 1, the wave engine is illustrated generally by the numeral 10. Pre-heated methane and nitrogen at atmospheric pressure and 890° F. are introduced through lines 11 into the wave engine. As subsequently more fully described, both ends of the wave engine receive reactants and driving gas, and from both ends driving gas and reaction products are withdrawn. The same numeral is employed at both ends of the wave engine to designate conduits and apparatus which correspond in function. It is to be understood that in many cases a single piece of apparatus can be substituted for the corresponding two pieces of apparatus having the same function, and in this case the materials introduced into and withdrawn from the wave engine can be suitably manifolded to the substituted single piece of apparatus. However for purpose of clarity, the respective pieces of apparatus are duplicated at each end of the wave engine.

A driving gas, for example hydrogen at 22 atmospheres and 1040° F., is introduced through the lines 12 into the respective ends of the wave engine. Shock waves are thereby created in the channels of the wave engine, in a manner which will be described more fully subsequently. The methane and nitrogen are adiabatically compressed, with resulting rapid increase in temperature. Subsequently a portion of the driving gas is removed from both ends of the wave engine through the lines 13, at about 22 atmospheres and 1090° F. Subsequently a second portion of the driving gas is withdrawn from the respective ends of the wave engine through the lines 14 at about 7 atmospheres and 645° F. Subsequently the remainder of the driving gas is withdrawn from the ends of the wave engine through the lines 15 at about 2 atmospheres and 330° F.

The last portion of the driving gas is cooled by passage through coolers 16 to reduce the temperature to 140° F. This portion of the driving gas is then compressed to about 7 atmospheres by passage through compressors 17. The resulting driving gas is admixed with the driving gas removed through line 14, and the mixture is cooled in coolers 18 to a temperature of 140° F. The cooled gas is compressed in compressors 19 to about 22 atmospheres, and is admixed with the driving gas removed through line 13. The mixture is introduced into the heaters 20, wherein it is heated to 1040° F. The heated driving gas at about 22 atmospheres is then reintroduced through line 12 into the wave engine. Following the removal of the driving gas from the respective ends of the wave engine the reaction products are withdrawn through the lines 21, at about 1540° F. and 0.5 atmosphere. The products are introduced into the separation zones 22 wherein they are subjected to known procedures for separation of gaseous mixtures containing methane, nitrogen, hydrogen, acetylene, and hydrogen cyanide. The separated hydrogen cyanide is removed through the lines 23 and 24. The separated acetylene is removed through the lines 25 and 26. In typical operation involving the use of a wave engine having a rotor 12 inches long, 3400 pounds per hour of an equal volume mixture of methane and nitrogen are reacted to produce about 290 pounds per hour of hydrogen cyanide and 700 pounds per hour of acetylene.

Hydrogen is separated from the other components of the reaction product mixture and is withdrawn through the lines 27. A portion of the withdrawn hydrogen can be compressed in the compressors 29 to about 22 atmospheres and introduced through the lines 30 into the heaters 20. Unreacted methane and nitrogen are separated from the other components of the product mixture and are recycled through the lines 31.

In FIGURES 2 and 5, the construction of the wave engine is illustrated. FIGURE 2 is an exploded view showing the left end and the right end respectively of the shell of the wave engine, the conduits for introduction and removal of reactants, driving gas and reaction products, and the rotor which in the operative position fits within the shell, the two halves of the shell being joined in the center as shown in FIGURE 5.

The rotor comprises an outer cylinder 32 and an inner cylinder 33, with a plurality of longitudinal vanes 34 secured to or integral with the outer surface of the cylinder 33, and secured to or integral with the inner surface of the cylinder 32. A plurality of longitudinal channels 36 are thereby provided, extending around the circumference of the rotor. A shaft 39 is secured to the rotor, and is rotated by suitable means not shown.

The two halves of the shell are illustrated by the numerals 35 and 37. Stationary end plates 38 and 40 are provided at the respective ends of the apparatus. Ports are provided in the end plate in various locations near the periphery, and these ports are adapted for the introduction and removal of gases from the channels 36. A port 42 is provided for introduction of reactants. A port 44 is provided for introduction of driving gas, and this port communicates with driving gas inlet conduit 54. Ports 46, 48 and 50, communicating with driving gas outlet conduits 56, 58 and 60 respectively, are provided for the removal of driving gas from the channels. A port 52, communicating with a reaction product outlet conduit 61, is provided for the removal of reaction products from the channels. Between the respective ports are portions, such as the portion 45, of the end plate, which separate one port from another.

A corresponding set of ports and conduits, having corresponding function, is provided at the left end of the wave engine as illustrated in FIGURE 2. The inlet conduit 62 is provided for introduction of reactants. The conduit 64 is provided for introduction of driving gas. The conduits 66, 68, and 70 are provided for removal of driving gas. The conduit 72 is provided for removal of reaction products. Each of these conduits communicates with a port which is directly opposite the corresponding port at the right end of the apparatus as illustrated in FIGURE 2.

In operation, the rotor is rotated in a clockwise direction, whereby each individual channel passes through a series of stages, in which it is at times in communication at each end with one of the ports referred to previously, at other times being closed at each end by the portions of the end plates between the ports. As a channel 36 comes in communication at its ends with the port 42 and the corresponding port at the other end, reactants are introduced into the channel from both ends. When the channel passes beyond the port 42, its ends are closed off by the portions of the end plates, and during this time there is neither introduction of gas into the channel nor removal of gas from the channel. Subsequently the ends of the channel come in communication with the port 44 and the corresponding port at the left end, and driving gas, e.g. hydrogen, thereupon enters the channel from each end. Because of the relatively high pressure of the driving gas the reactants in the channel are subjected to very rapid compression, as a result of the shock wave which travels from each end of the tube toward the center. The two shock waves meet in the center, and the gas is further compressed, resulting in further increase in temperature.

If desired, the channels may vary in cross sectional area to provide gradually decreasing area in the direction of travel of the shock waves. The speed of the waves is greater in the case where they are constricted in the direction of propagation. To accelerate the incident shock waves, channels gradually expanding toward each end from a minimum area in the center are employed.

When the channel comes in communication with the port 46 and the corresponding port at the other end, the removal of driving gas from each end of the channel begins, and a portion of the driving gas is withdrawn through the lines 56 and 66. Further removal of driving gas is effected through the conduits 58 and 68 when the ends of the channel come in communication with the corresponding ports. Withdrawal of the last portion of the driving gas is accomplished through lines 60 and 70. When the ends of the channel come in communication with the port 52 and the corresponding port at the other end, withdrawal of the reaction products through the lines 61 and 72 is begun. After removal of the reaction products, the ends of the channel come again in communication with the port 42 and the corresponding port at the other end, and introduction of additional reactants into the channel to begin another cycle takes place.

In FIGURE 3, a portion of the apparatus of FIGURE 2 is illustrated in a developed view. The conduits 62, 64, 66, 68, 70 and 72 at the left end of the apparatus are shown communicating with corresponding ports 76, 78, 80, 82, 84, and 86. The conduits at the right end are shown as communicating with the corresponding ports as illustrated in FIGURE 2. The conduit 74 for introduction of reactants, which was not visible in FIGURE 2, is shown in the appropriate place in FIGURE 3.

The rotation of the rotor is indicated in FIGURE 3 by movement vertically downwardly. As an individual channel 36 enters the area adjacent to the ports 42 and 76, reactants are introduced through conduits 62 and 74 into those ports and from there into the ends of the channel. As the channel passes beyond the ports 42 and 76, the introduction of reactants is terminated. When the channel comes in communication with ports 44 and 78, driving gas is introduced through conduits 54 and 64 simultaneously into both ends of the channel. Shock waves 90 and 92 are thereby generated, and travel toward the center of the tube at a speed exceeding the velocity of sound. The shock waves meet in the center of the tube, and reflected shock waves 94 and 96 are generated, traveling outwardly toward the ends of the channel. The velocities of the waves 94 and 96 are less than those of waves 90 and 92 because the waves 94 and 96 are traveling opposite to the direction of driving gas introduction.

The interfaces between driving gas and reactants are indicated by the numerals 98 and 100. When the shock waves 94 and 96 meet the interfaces 98 and 100 respectively, expansion waves 102 and 104 are generated and move toward the center of the channel. The shock waves 94 and 96, upon entering the driving gas, increase in velocity, because of the lesser density of the hydrogen as compared with the reactant gases, and the resulting more rapid shock waves 95 and 97 travel through the driving gas. The expansion waves 102 and 104 meet in the center of the channel, and a quiescent zone is formed at the center of the channel, the boundary of which zone moves outwardly along the lines 106 and 108. Because of the high temperature of the medium through which the waves 106 and 108 pass, and other factors, the waves 106 and 108 travel more rapidly than the shock waves 95 and 97. Consequently, they meet the waves 95 and 97 in the channel, whereupon the shock waves 95 and 97 are reduced in velocity, and slower shock waves 110 and 112 result.

During this period, the interfaces between the reactants in the center and the driving gas on either side are indicated by the numerals 114 and 116. The reactants are essentially stationary, and the interfaces remain substantially fixed during this period.

It is within the scope of the invention, but not preferred, to execute the compression of the reactants in more than one step, by admitting driving gas to the channels in a series of separate streams, at the same or different pressure levels, to generate a sequence of shock waves.

When the channel passes beyond the ports 44 and 78, its ends are closed off by the portions 45 of the end plate, and the introduction of driving gas is terminated. As the channel comes in communication with the ports 46 and 80, removal of driving gas is begun through the ports and the associated outlet conduits. During this period, expansion waves 118 and 120 move inwardly through the channel. When these waves meet the interfaces 114 and 116, the reaction products being to move outwardly in the channel along the interface lines 122 and 124. When the expansion waves 118 and 120 meet in the center, a quiescent zone is created at the center. The boundary of the quiescent zone moves outwardly along the lines 126 and 128. When these lines intersect the interfaces 122 and 124, the reaction products have come substantially completely to rest, and the interfaces remain stationary as indicated by the lines 130 and 132 during the next period. Numerous minor deviations from the interface positions shown in FIGURE 3 occur in actual operation, but for the sake of clarity these deviations are not shown, and the average overall pattern illustrates the principle of operation.

When the channel comes in communication with the ports 48 and 82, the removal of another portion of the driving gas to a lower pressure than in the preceding period is begun. Expansion waves 134 and 136 are generated, and when these waves intersect the interfaces 130 and 132, the interfaces begin to move outwardly along the lines 138 and 140. When the expansion waves meet in the center a quiescent zone is formed, the boundary of which moves outwardly along the lines 142 and 144. The interfaces become stationary as indicated at 146 and 148.

As the channel comes in communication with the ports 50 and 84, removal of the remainder of the driving gas to a still lower pressure is begun. Expansion waves 150 and 152 are generated, aand when these waves intersect the interfaces 146 and 148, the interfaces begin to move outwardly along the lines 154 and 156. The expansion waves meet in the center to form a quiescent zone, the boundary of which moves outwardly along the lines 158 and 160.

As the channel passes beyond the ports 50 and 84, it contains substantially no driving gas, the last portion of the driving gas having been withdrawn through these ports. Subsequently the reaction products are evacuated through the channel by passage through the ports 52 and 86 into the outlet conduits 61 and 72. Another cycle is then begun, in the operation illustrated in FIGURE 3, by introduction of a fresh charge of reactants through the ports 62 and 74, as the ends of the channel again come in communication with those ports. However, it is usually necessary, for practical operation, that a cooling and scavenging stage be provided, as subsequently described, prior to such introduction of fresh charge.

At the time when the shock waves 94 and 96 have reached the ends of the channel, the temperature of the reactants and reaction products in the channel is about 3200° F., and the temperature of the driving gas is about 1380° F., the pressure of the driving gas being about 40 atmospheres. The time required for the compression stage, beginning with the introduction of the driving gas and ending with the arrival of the shock waves 110 and 112 at the ends of the channel, is about 0.15 millisecond. The amount of driving gas in the channel is about 2.2 pounds per pound of reactants and reaction products at the end of that period. The time required for the removal of driving gas is typically about 0.45 millisecond total for the three stages. The time required for removal of reaction products is typically about 0.45 millisecond. Preferably the time elapsed between the first introduction of driving gas and the completion of the removal of reaction products is in the range from 0.75 to 1.5 milliseconds. The power requirement is about 1.8 horsepower hours per pound of acetylene and hydrogen cyanide produced, and the heat requirements for the pre-heating are about 8000 B.t.u. per hour.

In the preceding example, a molecule of reactant gas which is at the center of the channel at the moment that introduction of driving gas is begun, is typically at a temperature of about 3600° F. and pressure of 100 atmospheres at the maximum compression. During the following period, to approximately the middle of the second stage of driving gas removal, the temperature is generally lower, the temperature and pressure at the middle of the second driving gas removal stage being approximately 2900° F. and 22 atmospheres respectively. The time elapsed between the maximum compression stage and the middle of the second driving gas removal stage is about 0.35 millisecond.

A molecule of reactant gas which is at the end of the channel when the introduction of driving gas is begun, typically reaches about 3200° F. and 55 atmospheres at about 0.1 millisecond after the first introduction of driving gas. At the middle of the second driving gas removal stage, the temperature of this molecule is typically about 2600° F. and the pressure about 10 atmospheres.

The above conditions and results are calculated on the basis of a wave engine having a rotor 12 inches long and 7.6 inches in diameter, rotating at 7500 r.p.m., the wave engine containing 45 channels each 0.88 inch high; such wave engine is taken merely as an example. It is to be understood that the design of the wave engine involves a correlation between the dimensions of the apparatus and the speed of rotation. This correlation is necessary in order to provide the arrival of the individual channel at the proper position relative to the ports at a given time in order to obtain the proper timing of introduction of gases into and removal of gases from the channels.

The pressure ratio in the process according to the invention, i.e. the ratio of the initial pressure of the driving gas to the initial pressure of the reactants, is an important variable. Generally higher pressure ratios result in the attaining of higher temperatures as a result of subjection of the reactants to the shock waves. Generally the relatively high temperatures promote the desired reactions, and for this reason relatively high pressure ratios have a beneficial effect. Higher pressure ratios also result in the attaining of higher pressures in the reactant gas upon subjection to the shock waves. Excessively high pressures in the reactant gas are to be avoided in the case of reactions involving an increase in volume, if equilibrium is reached. On the other hand, relatively high pressures in the reactant gas usually tend to increase reaction rate by the effect of the increased concentration.

The necessary conditions for obtaining satisfactory operation vary according to the reaction involved. The following conditions are preferred in the production of acetylene and hydrogen cyanide from methane and nitrogen.

In order to obtain optimum reaction temperatures and pressures, it is preferred to employ a pressure ratio in the range from 20 to 25, and an initial pressure of reactants in the range from 1 to 2 atmospheres.

Preferably the reactants are introduced into the reaction channels at a temperature in the range from 850 to 900° F. Lower initial temperatures are avoided, since at the preferred pressure ratios, lower initial temperatures result in attained reaction temperatures which are undesirably low.

According to the present invention, the withdrawal of driving gas from the channels is performed in a plurality of stages, with stepwise reduction of pressure in the respective stages. Such removal in stages has important advantages as compared with removal of the driving gas in a single stage to a relatively low pressure. In the latter operation there is a large loss of kinetic energy, which cannot be recovered. Consequently the power requirements for the process are quite high when single stage removal of the driving gas is employed.

The kinetic energy loss is considerably reduced by the employment of a plurality of driving gas removal stages. Consequently the latter operation provides a greater yield of desired products for a given power input as compared with single stage removal.

On the other hand, it is necessary for optimum results that excessively long residence times of reactants in the channel at elevated temperature be avoided. The use of plural driving gas removal stages results in increased residence time. Therefore it is desirable that no more than four removal stages be employed, since greater numbers of stages result in the occurrence of undesired reactions to a disadvantageous extent as a result of the increased residence time.

Preferably, in the plural stage removal of driving gas, the ratio of the pressure of the removed gas in the stages following the first stage to the pressure of the removed gas in the preceding stage is approximately equal throughout the driving gas removal operation.

Preferably, three stages are employed with the pressure in each stage following the first stage being in the approximate range from 0.25 to 0.35 times the pressure in the preceding stage. However the invention contemplates generally the use of two or more driving gas removal stages.

A preferred driving gas for use according to the invention is hydrogen. Because of its low molecular weight, it is capable of attaining high flow speeds when expanded over a reasonable pressure ratio. Consequently it is capable of producing much higher reaction temperatures at a given pressure ratio than those which are obtainable with other common gases. The use of hydrogen is also advantageous in various given reactions in which hydrogen is one of the products of the reaction, since a source is thereby provided for makeup hydrogen which may be needed to replenish the driving gas. The mixing of driving gas with reactants in the operation of the wave engine typically occurs to a minor extent only, and such minor mixing in a process where hydrogen is present in the reaction product mixture anyway, is of course not detrimental.

In FIGURE 4, a cycle is illustrated, wherein a cooling and scavenging stage is provided. The operation down to the level of the port 86 is essentially as described in connection with FIGURE 3. Only one driving gas outlet port is shown at each end, 196 and 198, but it is to be understood that at least two driving gas outlets are to be provided at each end, similarly to FIGURE 3. As a channel passes beyond the port 86, its left end comes in communication with port 200, to which cooling and scavenging gas is introduced by a conduit not shown. The cooling as is preferably at somewhat higher pressure than the reaction products in the channel. The interface between cooling gas and reaction products moves to the right along line 204, as the cooling gas helps to evacuate the products through the port 52, a portion of which in this embodiment is opposite a portion of the port 200, which is the port for introduction of cooling gas. As the channel passes beyond the port 200, its left end comes in communication with port 76, a portion of which in this embodiment is opposite a portion of port 200, the port for evacuation of cooling gas through a conduit not shown.

Reactant gases are introduced through ports 42 and 76 to begin another cycle. The reactant gases are preferably at somewhat higher pressure than the cooling gas in the channel. The interface between fresh reactants and cooling gas moves to the right along line 210. When the right end of the channel comes in communication with port 42, introduction of reactant gases into the right end of the channels occurs. When the channel comes in communication with the ports 44 and 78, introduction of driving gas occurs, and this and the subsequent operation are the same as previously described. In the light of the present specification, a person skilled in the art can design apparatus for providing the introduction and removal pattern of FIGURE 4.

Any suitable cooling and scavenging gas can be employed, e.g. nitrogen, the reactant gas or gases, or a component or components thereof, etc. Oxygen is preferably avoided, in cases where hydrogen is present, in view of the explosion hazard.

Various modifications of the construction and operation of FIGURE 4 can be employed. For example, the scavenging gas can be eliminated, and the fresh reactants used to evacuate the residual reaction products through port 52. Also, the port 42 can be eliminated, and the reactants introduced entirely from one end of the channel. The construction and operation illustrated in FIGURE 3 of United States Patent No. 2,902,337 issued September 1, 1959, to Herbert S. Glick et al., with respect to the removal of reaction products (process gas) and the introduction of fresh reactants (process gas), can be employed in conjunction with the driving gas removal according to the invention.

The present invention is applicable to various chemical conversion processes having the characteristics previously mentioned with respect to reaction temperature and time. Examples of suitable processes are the production of hydrogen cyanide in the manner discussed, the production of carbon disulfide from hydrogen sulfide and a hydrocarbon, e.g. methane, the reaction of nitrogen with oxygen to produce nitrogen oxides, the production of acetylene from methane by pyrolysis or partial oxidation, the production of hydrazine from ammonia by pyrolysis or partial oxidation, the production of ammonia from nitrogen and hydrogen, the pyrolysis of methane to benzene, the production of nitriles from hydrocarbons and nitrogen or ammonia, the production of hydrocarbons from carbon monoxide and water, etc.

It is preferred according to the invention to introduce driving gas into the channels through a pair of opposed ports, as shown in the drawings, and to remove the driving gas through a pair of opposed ports, also as shown. However, other known means for introducing and removing driving gas from the channels can be employed, for example those illustrated in FIGURE 2 of the Glick et al. patent referred to previously. In the latter case, a plurality of driving gas outlets is provided at one end of the channels, in place of the single driving gas outlet shown in that figure.

In the use of methane, for example, as a reactant in the process according to the invention, it is desirable to mix the methane with a gas such as nitrogen in order to raise the specific heat ratio, i.e. the ratio of specific heat at constant pressure to specific heat at constant volume. For methane, this ratio ranges from 1.3126 at 500° R. to 1.0906 at 4800° R., whereas for an equal volume mixture of methane and nitrogen, the ratio ranges from 1.3509 at 500° R. to 1.1381 at 4800° R. The greater specific heat ratios for the nitrogen-containing mixtures make it possible to obtain much greater heating upon subjection to driving gas at given compression, than in the case of methane alone. Conversely, lesser compressions are required to produce a desired temperature of reaction, in the case of the nitrogen-containing mixtures. Thus, for example, a maximum reactant compression of about 300 atmospheres would be required to obtain temperatures in methane alone that are obtainable in the nitrogen-containing mixture at maximum reactant compression of about 100 atmospheres, as previously described.

Any suitable driving gas can be employed according to the invention. As noted previously, hydrogen is preferred, but helium and other driving gases as known in the art of wave engine operation can also be employed.

According to the present invention, the dimensions and speed of rotation of the equipment are correlated, in a manner capable of performance by the person skilled in the art in the light of the present specification, so that the various ports are opened and closed to coincide with the arrival of the various shock waves, expansion waves and interfaces at the ends of the tubes, as shown in the drawing.

The withdrawal, according to the invention, of driving gas from the channels in a plurality of stages at decreasing pressure levels prevents the excessive dissipation of driving gas energy as kinetic energy in leaving the channels. In the example previously given, with expansion of driving gas to levels of about 22 atmospheres, 7 atmospheres and 2 atmospheres, the velocity of the driving gas leaving the channels is restricted in each of the stages to the order of 3000 to 4000 feet per second. On the other hand, removal of driving gas in a single stage to a pressure level of 2 atmospheres for example, would result in driving gas exit velocities far in excess of 4000 feet per second, with resulting excessive loss of energy as kinetic energy.

In order to cool the reaction products to a suitably low temperature so that further undesired reactions do not occur, it is generally necessary, in the case of producing HCN and acetylene from methane and nitrogen, and other reactions, that the expansion of reaction products from the channels should be to a pressure level below the initial pressure of the reactants. Preferably, it should be to a pressure which is not more than 0.75 times, and more preferably not more than 0.5 times, the initial reactant pressure. In the example given previously, the expansion was to 0.5 atmosphere, or just one-half the initial reactant pressure in that example, and the resulting temperature was about 1540° F. On the other hand, if the expansion were to 1 atmosphere in that example, the resulting temperature would be in the order of 1800° F., which would cause undesired further reactions in the reaction products.

It is generally necessary for practical operation according to the invention for a cooling and scavenging stage to be provided following the stage in which reaction products expand from the reaction channels. Otherwise, a significant portion of the reaction products would remain in the channels and would be subjected to the action of the driving gas in the next cycle, with resulting decomposition to undesired products, and with excessive build-up of high temperatures in the channels and resulting damage to the equipment. To avoid these detrimental effects, it is preferred to employ a cooling and scavenging stage, for example as illustrated in FIGURE 4, in order to remove substantially all of the reaction products from the channels at the end of each cycle and to avoid excessive temperature increase.

In copending application Serial No. 214,154, filed June 26, 1962, as a division of the present application, the method of performing chemical reactions as disclosed herein, is disclosed and claimed.

The invention claimed is:

1. Apparatus for conducting chemical reactions which comprises a rotor having a plurality of channels spaced around the axis of the rotor; stationary end plates disposed at opposite ends of the rotor; a reactant gas inlet at at least one end of the channels; a driving gas inlet at at least one end of the channels; a plurality of driving gas outlets at at least one end of the channels; a reaction product outlet at at least one end of the channels; said rotor being rotatable to bring the ends of the channels successively in communication with the reactant gas inlet, the driving gas inlet, the driving gas outlets in series, and the reaction product outlet; first conduit means connecting one of said driving gas outlets with said driving gas inlet; and second conduit means connecting another of said driving gas outlets with said driving gas inlet.

2. Apparatus according to claim 1 wherein a pair of opposed driving gas inlets is provided at opposite ends of the channels, and a plurality of pairs of opposed driving gas outlets are provided at opposite ends of the channels.

3. Apparatus according to claim 1 wherein said second conduit means include a compressor for increasing the pressure of the driving gas during passage from said other driving gas outlet to said driving gas inlet.

4. Apparatus for conducting chemical reactions which comprises a rotor having a plurality of channels spaced around the axis of the rotor; stationary end plates disposed at opposite ends of the rotor; a reactant gas inlet at at least one end of the channels; a pair of opposed driving gas inlets at opposite ends of the channels; a plurality of pairs of opposed driving gas outlets at opposite ends of the channels; a reaction product outlet at at least one end of the channels; said rotor being rotatable to bring the ends of the channels successively in communication with the reactant gas inlet, the driving gas inlets, the driving gas outlets and the reaction product outlet; first conduit means connecting one of said pairs of driving gas outlets with said pair of driving gas inlets; and second conduit means connecting another pair of said driving gas outlets with said pair of driving gas inlets.

References Cited by the Examiner

UNITED STATES PATENTS

| | | | |
|---|---|---|---|
| 2,814,552 | 11/1957 | Van Dijck | 23—252 |
| 2,832,666 | 4/1958 | Hertzberg et al. | 23—1 |
| 2,898,199 | 8/1959 | Scott | 23—252 |
| 2,902,337 | 9/1959 | Glick et al. | 23—1 |

MORRIS O. WOLK, *Primary Examiner.*

MAURICE A. BRINDISI, JAMES H. TAYMAN, JR., E. C. THOMAS, *Assistant Examiners.*